(12) United States Patent
Priester

(10) Patent No.: US 10,167,621 B2
(45) Date of Patent: Jan. 1, 2019

(54) THRESHOLD TRENCH DRAIN

(71) Applicant: Jay R. Smith Mfg. Co., Montgomery, AL (US)

(72) Inventor: Donald Elwyn Priester, Deatsville, AL (US)

(73) Assignee: Jay R. Smith Mfg. Co., Montgomery, AL (US)

(*) Notice: Subject to any disclaimer, the term of this patent is extended or adjusted under 35 U.S.C. 154(b) by 104 days.

(21) Appl. No.: 15/280,295

(22) Filed: Sep. 29, 2016

(65) Prior Publication Data

US 2018/0087260 A1   Mar. 29, 2018

(51) Int. Cl.
  *E03F 5/06* (2006.01)
  *E03F 5/04* (2006.01)
  *E06B 1/70* (2006.01)

(52) U.S. Cl.
  CPC .............. *E03F 5/0407* (2013.01); *E03F 5/06* (2013.01); *E06B 1/70* (2013.01); *E03F 2005/068* (2013.01)

(58) Field of Classification Search
  CPC ........ E03F 5/04; E03F 5/0407; E03F 5/0408; E03F 5/06; E03F 2005/06; E03F 2005/068
  USPC ....... 210/163, 164; 4/613; 52/302.1
  See application file for complete search history.

(56) References Cited

U.S. PATENT DOCUMENTS

| | | | | |
|---|---|---|---|---|
| 1,622,652 A | * | 3/1927 | Lang .................... | E03F 5/0407 210/164 |
| 3,089,396 A | * | 5/1963 | Rowland .................. | E03F 5/06 210/163 |
| 3,527,148 A | * | 9/1970 | Schack .................... | E03F 5/06 404/25 |
| 8,337,694 B1 | * | 12/2012 | Sykes .................... | E04C 2/427 210/163 |
| 2008/0235885 A1 | * | 10/2008 | Huang .................... | E03F 5/06 14/69.5 |

(Continued)

FOREIGN PATENT DOCUMENTS

| CH | 374944 | * | 3/1964 |
|---|---|---|---|
| DE | 2265304 A1 | | 6/1977 |

(Continued)

OTHER PUBLICATIONS

Zurn Industries, LLC, Z895-94 Elevator Trench Drain System, Specification Sheet, Jul. 5, 2016,http://www.zurn.com/Pages/ProductDetails.aspx?NodeKey=454561.

*Primary Examiner* — Christopher Upton
(74) *Attorney, Agent, or Firm* — Eric J. Sosenko; Jonathan P. O'Brien; Honigman Miller Schwartz and Cohn LLP

(57) ABSTRACT

A threshold drain for connecting to a drain system and collecting an incoming flow of water from a predetermined direction across a threshold at the installation site. The drain includes a catch pan with portions defining a pan outlet. A flange pipe is coupled to the pan outlet for the purpose of connecting the threshold drain to the drain system. A grate is received within the catch pan and includes transverse webs and longitudinal webs. The transverse webs extend parallel to one another along the width of the catch pan and are spaced above the pan bottom wall. The longitudinal webs extend parallel to one another along the length of the catch pan and are supported by the transverse webs above the pan bottom wall in a fixed orientation. The fixed orientation is inclined toward the pan side walls adjacent to the incoming flow of water.

14 Claims, 4 Drawing Sheets

(56) References Cited

U.S. PATENT DOCUMENTS

2009/0049768 A1* 2/2009 Kim .................. E03F 5/06
                                                  210/164
2017/0241145 A1* 8/2017 Gomo ................ E04F 17/00

FOREIGN PATENT DOCUMENTS

| DE | 19622021 A1 | 12/1997 |
| EP | 1143080 A1 | 10/2001 |
| WO | 9822381 A1 | 5/1998 |
| WO | WO 2017/55646 * | 4/2017 |

* cited by examiner

THRESHOLD TRENCH DRAIN

BACKGROUND

1. Field of the Invention

The present invention generally relates to thresholds and, more specifically, a threshold drain and drainage system as might be used with a door, stairwell or elevator threshold.

2. Description of Related Art

Thresholds provide a transition between different environments or spaces at an installation site. For example, a threshold assembly may provide a transition from an interior space to an exterior space of a building, such as at a door. Additionally, the threshold assembly may be provided at a transition from one interior space to another interior space, such as from an interior hallway into the stairwell of a building or from an elevator lobby into the elevator. A threshold assembly may also provide a transition from one exterior space to another exterior space, such as from an uncovered outdoor space to a covered outdoor space.

Most all public accommodations are now required to incorporate fire suppression systems into the construction. During a fire suppression event, a large amount of water is discharged by the fire suppression system into the space where the event was detected. The discharging of water by the fire suppression system may only occur in that area of the building where the triggering event was sensed. However, once discharged, the associated large volume of water is not confined to the area of the triggering event. Rather, discharged water often flows across thresholds and into adjacent spaces of the building. For example, water discharged on one floor may cross a stairway door threshold and flow into and down the stairwell, and possibly into other floors located below. In another example, water discharged on the floor may flow across an elevator threshold and into the elevator shaft itself. As previously noted, the fire suppression event generates a large flow water and the inflow of water across a threshold may be as much as 100 gallons per minute (GPM). As a result, a large amount of unnecessary property damage can be caused by water flowing into a space not directly associated with the event triggering the fire suppression system.

In view of the above, it is apparent that it would be preferable to contain the flow of water during a fire suppression event across the threshold and prevent the flow of water from entering into the adjacent space, minimizing or preventing damage to the adjacent or other spaces.

SUMMARY

In satisfying the above need, as well as overcoming the enumerated drawbacks and other limitations of the related art, the present invention provides a threshold drain for connecting to a drain system and collecting an incoming flow of water from a predetermined direction across a threshold at an installation site.

In one aspect of the invention, a threshold drain provided. The threshold pan includes a catch pan having pan sidewalls, pan end walls, a pan bottom wall and a pan open top. The width of the catch pan is defined between the pan sidewalls, the length is defined between the pan end walls and a depth defined between the pan bottom wall and the pan open top. The pan bottom wall includes portions defining a pan outlet. Coupled to the pan outlet and extending away from the catch pan is a pipe flange. The flange pipe defines a central axis and is configured to couple the threshold drain to the drainage system. A grate is received within the catch pan and includes transverse webs and longitudinal webs with spaces defined there between. The transverse webs extend parallel to one another along the width of the catch pan and are spaced above the pan bottom wall. The longitudinal webs extend parallel to one another along the length of the catch pan and are supported by the transverse webs above the pan bottom wall in a fixed orientation. The fixed orientation is inclined toward the pan side wall that is located on the side of the threshold drain toward the incoming flow of water.

In another aspect of the invention, the longitudinal webs of the threshold drain are planar.

In a further aspect, the longitudinal webs have a top surface and a lower edge, the top surface being located toward the pan open top and the lower edge being located toward the pan bottom wall.

In yet another aspect, the top surface of the threshold drain is flush with upper surfaces of at least one of the transverse webs, the pan sidewalls and the pan end walls.

In still a further aspect, upper surface is planar with upper surfaces of the pan sidewalls and the pan end walls.

In additional aspect, the fixed orientation of the threshold drain is inclined at an angle of about 20°.

In a further aspect, the fixed orientation is inclined at an angle in the range of about 5° to 20°.

In another aspect of the invention, the threshold drain comprises a sump connecting the flange pipe to the catch pan. The sump is attached to the bottom wall about the pan outlet with the sump including at least one sump sidewall, a sump bottom wall and a sump open top. The sump open top is defined by the pan outlet and the sump bottom wall has portions defining a sump outlet and the sump.

In a further aspect of the invention, the sump sidewall of the threshold drain is a round cylinder.

In a still further aspect, the drain has a height of less than about 2 inches.

In another aspect, the height of the drain is about 1.75 inches.

In an additional aspect of the invention, a threshold drain installation is provided and includes an installation site having a first area with a fire suppression system and a second area. The second area is adjacent to the first area and separated therefrom by a threshold. A threshold drain is provided in the threshold between the first area and the second area with the threshold drain further including a catch pan, a flange pipe and a grate. The catch pan includes pan sidewalls, pan end walls, a pan bottom wall and a pan open top. The width of the catch pan is defined by the pan sidewalls, the length defined by the pan end walls and the height defined by the pan bottom wall and the pan open top. The pan bottom wall includes portions defining a pan outlet and the flange pipe is connected to the pan outlet and extends away from the catch pan. The flange pipe defines a central axis and is configured to couple the threshold drain to the drain system. The grate is received within the catch pan and includes parallel longitudinal webs and parallel transverse webs defining spaces there between. The transverse webs extend along the width of the catch pan and are spaced above the pan bottom wall. The longitudinal webs extend along the length of the catch pan and are supported by the transverse webs in a fixed orientation. The plurality of the longitudinal webs is inclined toward one of the side walls at an angle.

In an additional aspect, the longitudinal webs of the threshold drain installation are planar.

In a further aspect, the longitudinal webs have a top surface and a lower edge, with the top surface being located toward the pan open top and the lower edge being located toward the pan bottom wall.

In another aspect, the top surface of the threshold drain installation is flush with upper edges of at least one of the transverse webs, pan sidewalls and pan end walls.

In a further aspect of the invention, the fixed orientation of the threshold drain installation is inclined at an angle of about 20°.

In a still further aspect, the fixed orientation of the threshold drain installation is inclined at an angle in the range of about 5° to 20°.

In an additional aspect, the threshold drain installation further includes a sump connecting the flange pipe to the catch pan. The sump is attached to the bottom wall about the pan outlet. The sump includes at least one sump sidewall, a sump bottom wall and a sump open top. The sump open top is defined by the pan outlet and the sump bottom wall has portions defining a sump outlet and the sump.

In a further aspect, the drain of the threshold drain installation has a height of less than about 2 inches.

In a still further aspect of the invention, the height of the threshold drain installation is about 1.75 inches.

Further objects, features and advantages of this invention will become readily apparent to persons skilled in the art after review of the following description with reference to the drawings and the claims that are appended to inform a part of this specification.

DETAILED DESCRIPTION

As used in the description that follows, directional terms such as "upper" and "lower" are used with reference to the orientation of the elements as presented in an installed state and as shown in the figures. Accordingly, "upper" indicates a direction toward the top of the figure and "lower" indicates a direction toward the bottom of the figure. The terms "left" and "right" are similarly interpreted relative to the figures. The terms "inward" or "inner" and "outward" or "outer" indicate a direction that is generally toward or away from a central axis of the referred to part, whether or not such an axis is designated in the figures. It will be understood, however, that in actual implementation, the directional references used herein may not necessarily correspond identically with the installation and orientation of the corresponding components or device.

Figure 1:
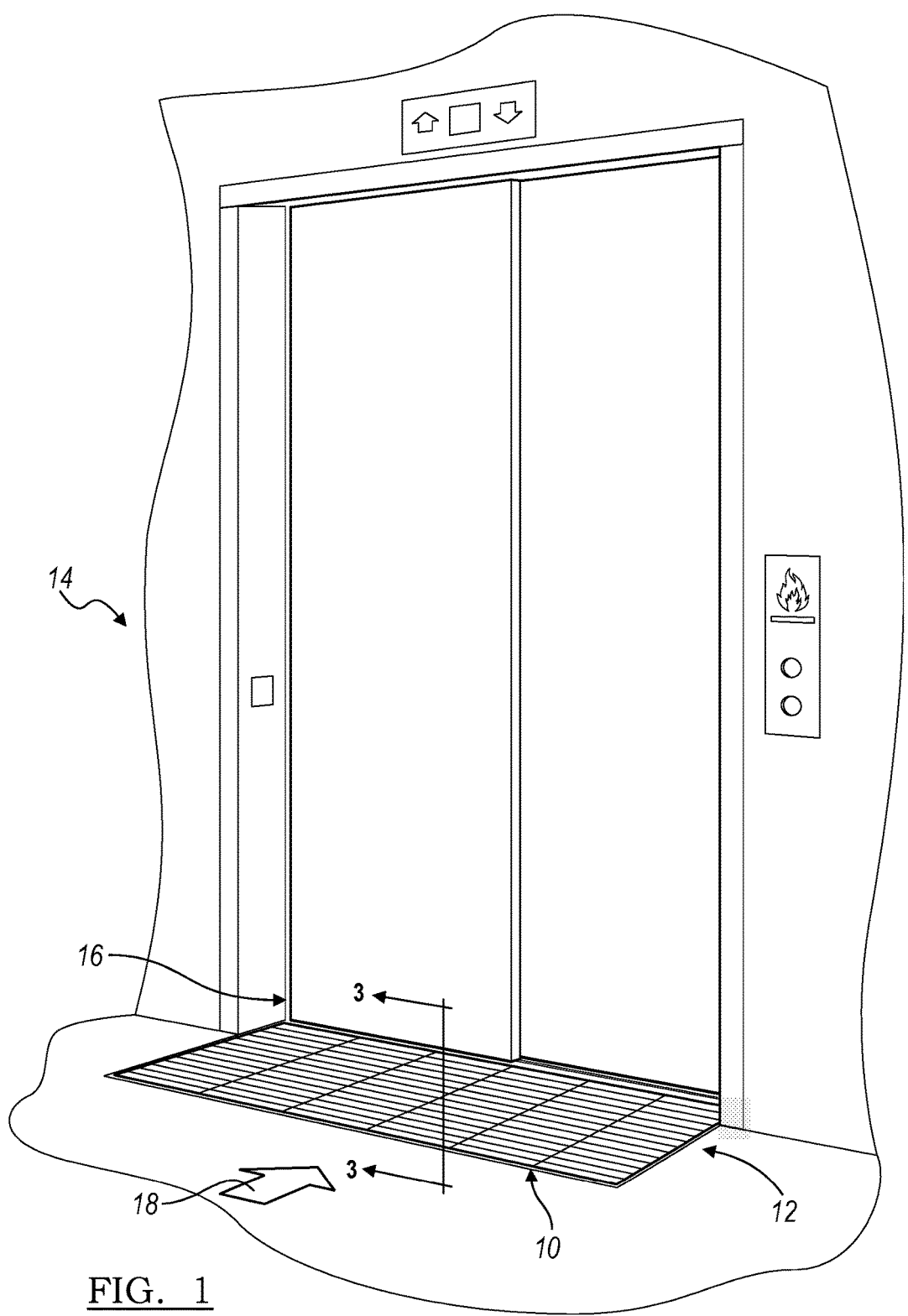
FIG. 1 is a perspective view of an elevator lobby incorporating a threshold trench drain embodying the principles of the present invention.

Referring now to the drawings, a threshold drain (hereafter "drain") embodying the principles of the present invention is generally illustrated in FIG. 1 and designated at 10. As shown therein, the drain 10 is installed in a threshold 12 that defines the transition between an elevator lobby 14 and an elevator or elevator shaft 16. During a fire suppression event in the elevator lobby 14 or adjacent area, a large volume of water will be discharged into the elevator lobby 14. Invariably, this large volume of water will establish an inflow direction 18 from the elevator lobby 14 across the elevator threshold 12 and into the elevator shaft 16, potentially damaging additional aspects of the building.

While the present invention is being specifically illustrated and described in connection a threshold 12 between an elevator lobby 14 and an elevator/elevator shaft 16, it will be readily appreciated that the principles of the present invention are equally applicable to any threshold installation between two adjacent areas where it is desirable to prevent the flow of water between adjacent areas during a fire suppression event. Accordingly, the present invention is not intended to be limited to any one specific type of installation.

Figure 2:
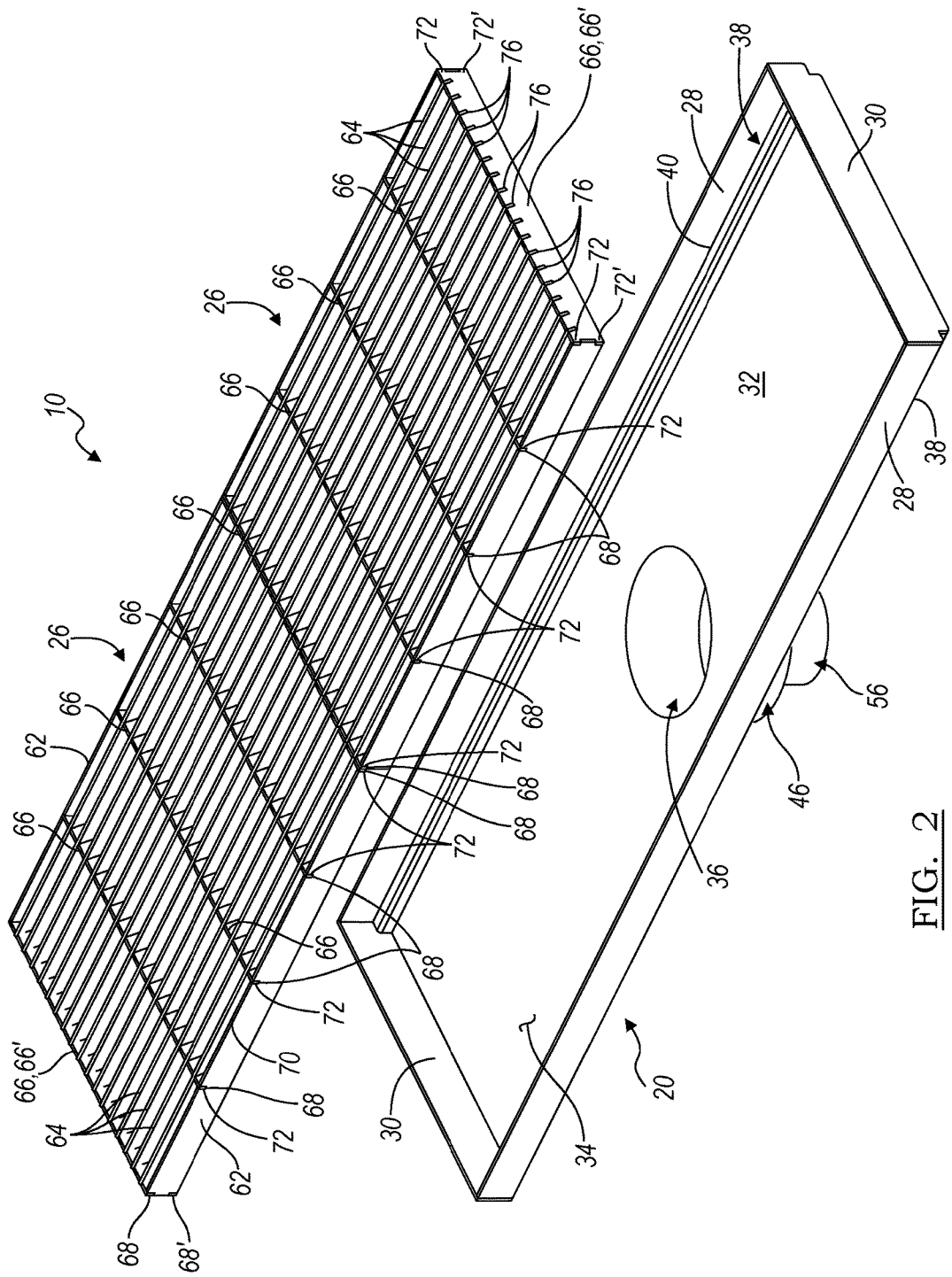
FIG. 2 is a exploded perspective view of an a threshold trench drain embodying the principles of the present invention.

Referring now to FIG. 2, the drain 10 is illustrated in an exploded view and is seen as having as its principal components a catch pan 20, a sump 46, a pipe flange 56, and a pair of grates 26, although a single grate 26 could alternately be employed.

The catch pan 20 has a generally rectangular configuration and includes opposing parallel pan sidewalls 28 between which extend opposing parallel pan end walls 30. While illustrated with a rectangular configuration, it will be really appreciated that, depending on the requirements of the particular installation, the configuration can be other than rectangular.

While other materials and sizes may be provided, the catch pan 20 is preferably constructed from 14 gauge stainless steel sheet (0.0781 inch nominal thickness), has an overall length of about 42 inches and a width of about 13 9/16 inches, thereby providing the catch pan 20 with a length to width ratio of 3.1:1 or about 3:1.

The catch pan 20 also includes a pan bottom wall 32 and a pan open top 34. The pan bottom wall 32 extends between the pan sidewalls 28 and the pan end walls 30 and, as the name implies, defines the bottom wall of the catch pan 20. Portions of the pan bottom wall 32 define a pan outlet 36, which is illustrated as being round and centrally located in the pan bottom wall 32. The pan outlet 36, however, may be provided other than centrally and other than in a round configuration, depending on the particular requirements of the installation.

As seen in FIG. 2, each of the pan sidewalls 28 is formed with an inwardly extending step or shoulder 38 that defining a support surface 40. The shoulders 38 and support surfaces 40 may be provided approximately halfway or more than halfway down the height of the pan sidewalls 28 and are utilized to support the grate 26 above the upper surface of the pan bottom wall 32, as further discussed below. Optionally, the shoulders 38 and support surfaces 40 may be omitted if other features are provided to space the grate 26 or portions of the grate 26 above the pan bottom wall 32.

It is additionally noted that the pan sidewalls 28 have a height that renders the catch pan 20, as well as the drain 10, with a shallow depth. Preferably, the height of the pan sidewalls 28, as measured from the lower surface 42 of the pan bottom wall 32 to the top surface 44 of the pan sidewalls 28, is about 2 inches and more preferably about 1.75 inches. Providing the pan sidewalls 28 and the drain 10 with such a shallow height allows the drain 10 to be installed on a subfloor of the installation site and allows the finished floor of the installation site to be build up so as to be flush with the top of the drain 10. Deeper drains, those with pan sidewalls 28 greater than that mention above, would require that the subfloor of the installation site be modified to accommodate and accept such a drain. Alone, the shallow catch pan 20 reduces the capacity of water (gallons per minute or GPM) that can be accommodated by the drain 10.

Mounted to the pan bottom wall 32 about the pan outlet 36 is a sump 46. The sump 46 generally includes a round cylindrical sump sidewall 48 extending downward from the bottom surface 42 of the pan bottom wall 32. A sump bottom wall 50 closes off the lower portion of the sump sidewall 46 and further includes portions defining a sump outlet 52 through the sump bottom wall 48. The upper extent of the sump 46 is defined by a sump open top 54, which is generally coincident with the pan outlet 36.

Connected to the sump bottom wall 50, generally about the sump outlet 52, is a pipe flange 56. The pipe flange 56 is defined by a round cylindrical flange sidewall 58, extending generally perpendicularly away from the pan bottom wall 32. When installed, the pipe flange 56 couples the catch pan 20 and the drain 10 to the drain system (not shown) of the installation site. Preferably, the drain 10 includes no restriction upstream of the pipe flange 56 that is less than that of the pipe flange 56 itself. Since the pipe flange 56 extends perpendicularly away from the pan bottom wall 32, the pipe flanged 56 operates to define a reference axis 60 that is generally vertically oriented in the installed position.

Each grate 26 is rectangular in shape and sized to be received within the catch pan 20. Two side rails 62 define the lateral extent of the grate 26 and are received on the support surfaces 40 of the shoulders 38. Provided between the side rails 62 is a series of longitudinal webs 64 and transverse webs 66. Of the transverse webs 66, two webs 66' define the longitudinal extent of the grate 26. If the shoulders 38 and support surfaces 40 are optionally omitted from the pan sidewalls 28, as previously discussed, the side rails 62 may be provided with a width dimension (which would be vertical in the illustrated drawings) that would allow the longitudinal webs 64 and transverse webs 66 to be spaced above the pan bottom wall 32.

As seen in FIG. 2, the side rails 62 are formed with a series of notches 68 along their upper edge 70. Corresponding tabs 72 formed on the ends of the transverse webs 66 are received within the notches 68 and allow for the side rails 62 to support the transverse webs 66. Preferably, the engagement between the notches 68 and tabs 72 is such that the transverse webs 66 are permanently attached to the side rails 62. Accordingly, this engagement may be a welded engagement or similarly fixed engagement.

The transverse webs 66' forming the ends of the grate 26 may be provided with a slightly different construction than the remaining transverse webs 66 due to the fact that they define the longitudinal ends of the grate 26. In this regard, the transverse webs 66' may further include a lower tab 72' that engages in a corresponding lower notch 68' in a permanently or fixedly attachment. Such an engagement provides additional rigidity to the grate 26.

Figure 3:
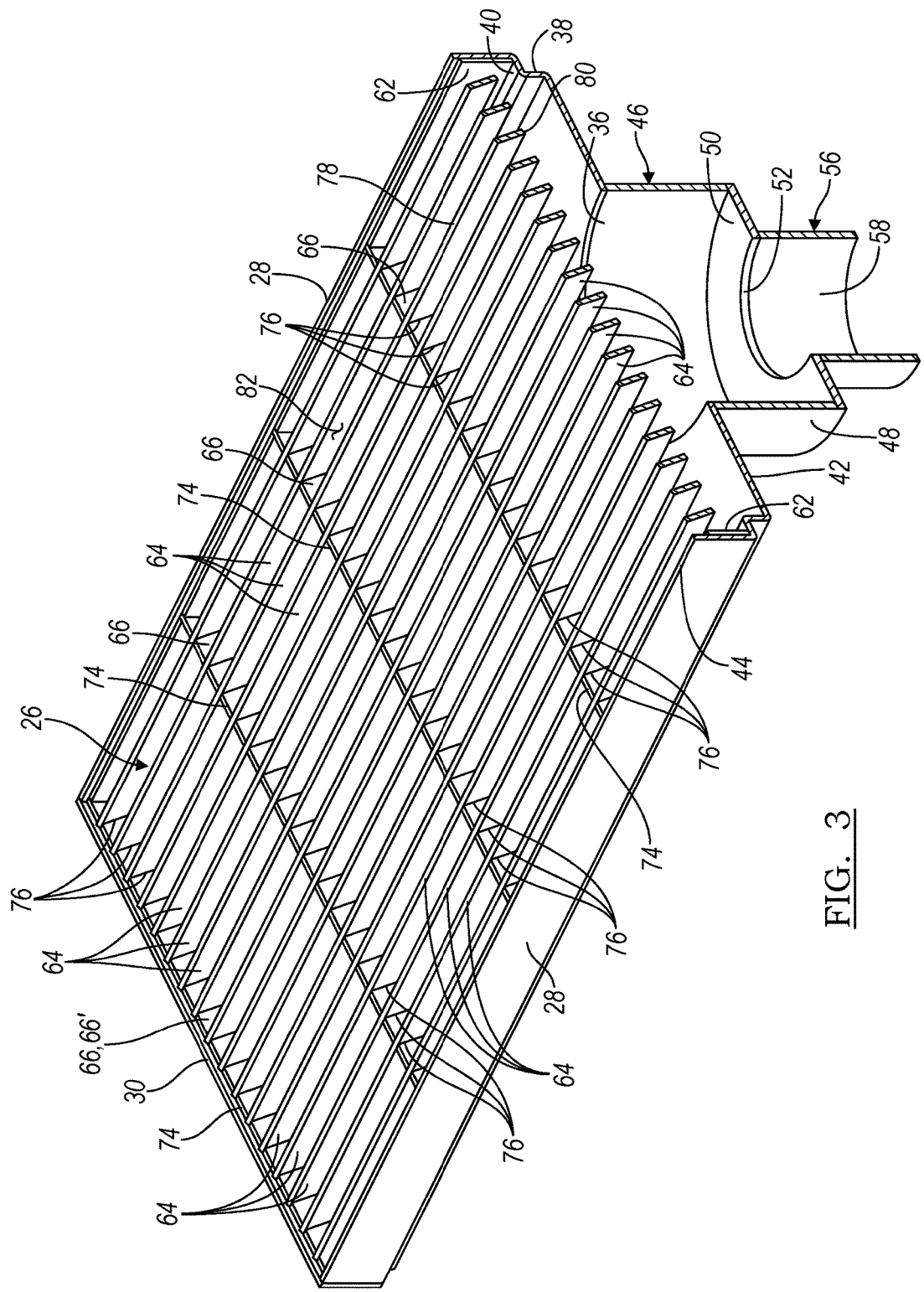
FIG. 3 is a cross-section view along line 3-3 of FIG. 1 of a threshold trench drain embodying the principles of the present invention.

Each of the transverse webs 66 includes along its upper edge 74 a series of equal distantly spaced angled notches 76. This is readily seen in FIGS. 3 and 4. Relative to vertical or the reference axis 60, the angled notches 76 are preferably formed at an angle (a) of about 5° to 20°, with about 20° being more preferred. In all instances, however the angle is greater than 0° and less than 90°. The angled notches 76 are correspondingly shaped to the cross-section of the longitudinal webs 64 so that each of the longitudinal webs 64 may be received in a series angled notches 76 defined in adjacent transverse webs 66. Accordingly, each longitudinal web 64 extends across a plurality of transverse webs 66 and is received in one angled notch 76 of each transverse web 66. The engagement between the longitudinal webs 64 and the transverse webs 66 at the angled notches 76 is preferably a permanently engagement, such as by welding or a similarly fixed engagement.

When the longitudinal webs 64 are engaged with the transverse webs 66, it is preferred that the uppermost portion of the longitudinal webs 64 is polished or ground so that the longitudinal webs 64 are provided with a top edge or surface 78 that is flush with upper edge or surface 74 of the transverse webs 66.

Figure 4:
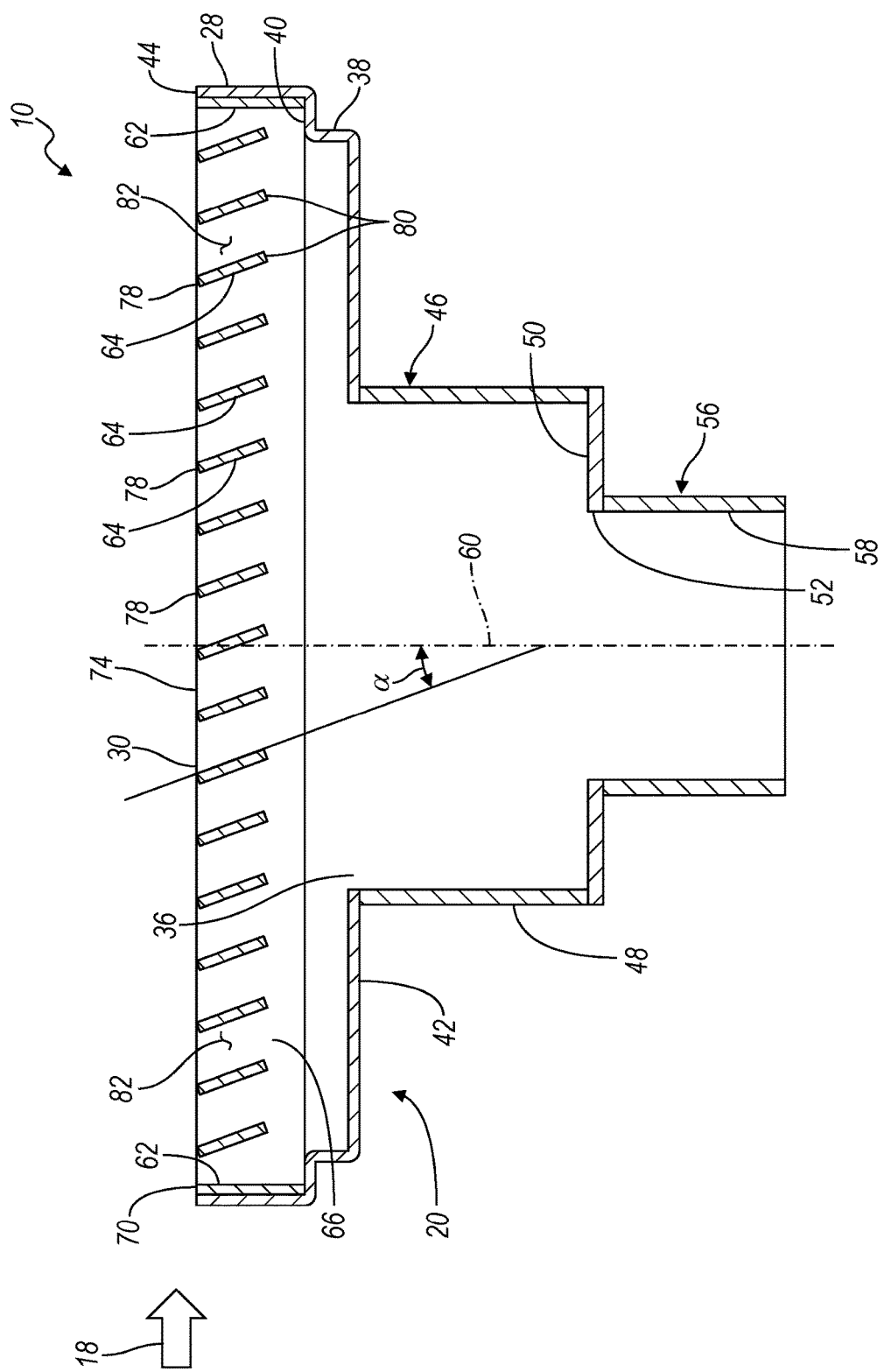
FIG. 4 is an end cross-sectional view of the threshold embodying the principles of the present invention.

As previously noted, the transverse webs 66 are equally spaced from one another in the grate 26. Additionally, the longitudinal webs 64 are parallel to one another, spaced approximately ½ to ¼ inches apart, and all angled in a common direction, namely toward one of the side rails 62. As seen in FIG. 4, the upper edges 78 of the transverse webs 64 are located closer to the left side rail 62 than the respective lower edges 80 of the longitudinal webs 64. The side rail 62 toward which the longitudinal webs 64 are angled is the side rail 62 (the inflow side rail) located on the side of the drain 10 from which the inflow 18 of water is to be received during the fire suppression event. This is the expected inflow side of the drain 10 and is oriented toward the elevator lobby 14 in FIG. 1.

The angular orientation of the transverse webs 66 provides an unexpected advantage to the drain 10 when used in conjunction with the shallowness of the catch pan 20. The angular orientation of the longitudinal webs 64 operates to disrupt the surface tension of the inflow 18 as it passes across the top of the drain 10. The disruption of the surface tension of the inflow 18 allows a greater amount of the inflow 18 to be drawn into the drain 10, through the spaces 82 between adjacent longitudinal webs 64, and to not pass over the top of the grate 26. Absent this angular orientation of the longitudinal webs 64, such as if the longitudinal webs of a grate were provided with a vertical orientation or 0° orientation, the flow rate of water reaching the drain during a fire suppression event would exhibit a surface tension that would allow a substantial portion of the water to flow across and over the drain, and therefore across the threshold and into the adjacent space of the building or installation site, potentially causing additional water damage. With a drain 10 constructed according to the principles of the present invention, the surface tension of the inflow 18 is disrupted and a shallow threshold trench drain 10 with a high-capacity, up to 100 GPM, is provided.

As a person skilled in the art will really appreciate, the above description is meant as an illustration of at least one implementation of the principles of the present invention. This description is not intended to limit the scope or application of this invention since the invention is susceptible to modification, variation and change without departing from the spirit of this invention, as defined in the following claims.

I claim:

1. A threshold drain for connecting to a drain system and collecting an incoming flow of water from a predetermined direction across a threshold at an installation site, the threshold drain comprising:
   a catch pan having pan sidewalls, pan end walls, a pan bottom wall and a pan open top, the catch pan having a width defined between the pan sidewalls, a length defined between the pan end walls and a depth defined between the pan bottom wall and the pan open top of not more than two inches, the pan bottom wall including portions defining a pan outlet;

a flange pipe coupled to the pan outlet and extending away from the catch pan, the flange pipe defining a central axis and being configured to couple the threshold drain to the drain system; and a grate received within the catch pan and including transverse webs and longitudinal webs, the transverse webs extending parallel to one another along the width of the catch pan and being spaced above the pan bottom wall, the longitudinal webs extending parallel to one another along the length of the catch pan and being supported by the transverse webs above the pan bottom wall in a fixed orientation, the longitudinal webs being planar and having an upper terminal end disposed toward the pan open top and a lower terminal end disposed toward the pan bottom wall, the fixed orientation of the longitudinal webs being an inclined orientation with the upper terminal ends of the longitudinal webs located toward one of the pan side walls and the lower terminal ends of the longitudinal webs located toward the other of the pan side walls, whereby the inclined orientation orients the upper terminal ends is in a direction toward the incoming flow of water from the predetermined direction.

2. The threshold drain according to claim 1, wherein a top surface of the upper terminal end is flush with upper surfaces of at least one of the transverse webs, the pan sidewalls and the pan end walls.

3. The threshold drain according to claim 1, wherein the upper surface is planar with upper surfaces of the pan sidewalls and the pan end walls.

4. The threshold drain according to claim 1, wherein the fixed orientation is inclined at an angle of about 20°.

5. The threshold drain according to claim 1, wherein the fixed orientation is inclined at an angle in the range of about 5° to 20°.

6. The threshold drain according to claim 1, further comprising a sump connecting the flange pipe to the catch pan, the sump being attached to the bottom wall about the pan outlet, the sump including at least one sump sidewall, a sump bottom wall and a sump open top, the sump open top being defined by the pan outlet, the sump bottom wall having portions defining a sump outlet and the sump.

7. The threshold drain according to claim 6, wherein the sump sidewall is a round cylinder.

8. The threshold drain according to claim 1, wherein the height is about 1.75 inches.

9. A threshold drain installation connected to a drain system, the installation comprising:

an installation site having a first area with a fire suppression system and a second area, the second area being adjacent to the first area and separated by a threshold; and a threshold drain provided in the threshold between the first area and the second area, the threshold drain further comprising a catch pan, a flanged pipe and a grate;

the catch pan having pan sidewalls, pan end walls, a pan bottom wall and a pan open top, the catch pan also having a width defined by the pan sidewalls, a length defined by the pan end walls and a height of not more than two inches defined by the pan bottom wall and the pan open top, the pan bottom wall including portions defining a pan outlet;

the flange pipe connected to the pan outlet and extending away from the catch pan, the flange pipe defining a central axis and being configured to couple the threshold drain to the drain system; and the grate being received within the catch pan and including parallel longitudinal webs and parallel transverse webs, the transverse webs extending along the width of the catch pan and being spaced above the pan bottom wall, the longitudinal webs extending along the length of the catch pan and being supported by the transverse webs, the longitudinal webs being planar and having an upper terminal end and a lower terminal end, the longitudinal webs being provided in a fixed inclined orientation with the upper terminal ends directed toward the side wall closest to the first area of the installation site.

10. The threshold drain installation according to claim 9, wherein the upper terminal end is flush with upper edges of at least one of the transverse webs, pan sidewalls and pan end walls.

11. The threshold drain installation according to claim 9, wherein the fixed orientation is inclined at an angle of about 20°.

12. The threshold drain installation according to claim 9, wherein the fixed inclined orientation is inclined at an angle in the range of about 5° to 20°.

13. The threshold drain installation according to claim 9, further comprising a sump connecting the flange pipe to the catch pan, the sump being attached to the bottom wall about the pan outlet, the sump including at least one sump sidewall, a sump bottom wall and a sump open top, the sump open top being defined by the pan outlet, the sump bottom wall having portions defining a sump outlet and the sump.

14. The threshold drain installation according to claim 9 wherein the height is about 1.75 inches.

* * * * *